United States Patent
Yashiro et al.

(10) Patent No.: US 7,710,855 B2
(45) Date of Patent: May 4, 2010

(54) OPTICAL RECORDING MEDIUM, RECORDING AND REPRODUCING METHOD THEREOF, AND OPTICAL RECORDING APPARATUS

(75) Inventors: Tohru Yashiro, Ebina (JP); Yuki Nakamura, Machida (JP); Tatsuo Mikami, Kanagawa (JP); Ikuo Shimizu, Tokyo (JP); Motoharu Kinugasa, Yokkaichi (JP); Hiroshi Toyoda, Yokkaichi (JP)

(73) Assignee: Ricoh Company, Ltd., Tokyo (JP)

( * ) Notice: Subject to any disclaimer, the term of this patent is extended or adjusted under 35 U.S.C. 154(b) by 347 days.

(21) Appl. No.: 11/631,467

(22) PCT Filed: Jun. 30, 2005

(86) PCT No.: PCT/JP2005/012523

§ 371 (c)(1),
(2), (4) Date: Mar. 3, 2008

(87) PCT Pub. No.: WO2006/004172

PCT Pub. Date: Jan. 12, 2006

(65) Prior Publication Data

US 2008/0316890 A1    Dec. 25, 2008

(30) Foreign Application Priority Data

Jun. 30, 2004 (JP) .............................. 2004-193576
Jun. 28, 2005 (JP) .............................. 2005-188996

(51) Int. Cl.
G11B 3/70 (2006.01)
B32B 3/00 (2006.01)

(52) U.S. Cl. ........................ 369/288; 369/283; 428/64.8

(58) Field of Classification Search ... 369/275.1–275.5, 369/284, 283, 288, 94, 13.02; 428/64.1–64.8; 720/718
See application file for complete search history.

(56) References Cited

U.S. PATENT DOCUMENTS

| 2003/0206514 A1 | 11/2003 | Noguchi et al. |
| 2004/0202098 A1 | 10/2004 | Yashiro et al. |
| 2005/0063295 A1 | 3/2005 | Muramatsu et al. |
| 2007/0269628 A1* | 11/2007 | Yashiro ...................... 428/64.4 |

FOREIGN PATENT DOCUMENTS

| EP | 1067535 A2 | 1/2001 |
| EP | 1335357 A1 | 8/2003 |
| JP | 11-66622 | 3/1999 |
| JP | 2000-311384 | 11/2000 |
| JP | 2001-23237 | 1/2001 |
| JP | 2002-370451 | 12/2002 |
| JP | 2002-370452 | 12/2002 |
| JP | 2002-370453 | 12/2002 |

(Continued)

*Primary Examiner* — Ali Neyzari
(74) *Attorney, Agent, or Firm* — Cooper & Dunham LLP

(57) ABSTRACT

The present invention relates to an optical recording medium containing a first substrate, a first information layer, an intermediate layer, a second information layer and a second substrate in this order, wherein the first information layer contains a first recording layer disposed on the first substrate and the second information layer contains a reflective layer, a second recording layer containing an organic dye and a protective layer which are disposed on the second substrate in this order; and the second recording layer contains an organic dye which is at least one elected from the group consisting of the specified squarylium metal chelate compounds.

14 Claims, 3 Drawing Sheets

Laser for Recording & Reproducing

FOREIGN PATENT DOCUMENTS

| | | |
|---|---|---|
| JP | 2002-370454 | 12/2002 |
| JP | 2003-170664 | 6/2003 |
| JP | 2003-305958 | 10/2003 |
| JP | 2003-331473 | 11/2003 |
| WO | WO01/44233 A1 | 6/2001 |
| WO | WO01/44375 A1 | 6/2001 |
| WO | WO02/50190 A1 | 6/2002 |

* cited by examiner

Laser for Reproducing

Laser for Recording & Reproducing

↑ Laser for Recording & Reproducing

⇧ Laser for Recording & Reproducing

Laser for Recording & Reproducing

OPTICAL RECORDING MEDIUM, RECORDING AND REPRODUCING METHOD THEREOF, AND OPTICAL RECORDING APPARATUS

TECHNICAL FIELD

The present invention relates to an optical recording medium (hereinafter referred to as "optical information recording medium" or "information recording medium" sometimes) which is preferably applied particularly to a write-once DVD disc, a recording and reproducing method and optical recording apparatus using the optical recording medium.

BACKGROUND ART

In addition to an optical recording medium, such as a reproduction-only DVD (digital versatile disc), a recordable DVD (e.g., DVD+RW, DVD+R, DVD-R, DVD-RW and DVD-RAM) is put to practical use.

The DVD+R and DVD+RW are on the way of improving the conventional technique for CD-R and CD-RW (a recordable compact disc) and for securing a reproducing compatibility of the DVD+R and DVD+RW with a reproduction-only DVD, the DVD+R and DVD+RW are so designed that a recording density (e.g., track pitch and signal mark length) and a thickness of the substrate are also compatible with those of CDs in order to attain the reproducing compatibility with DVD-ROMs. For example, the DVD+R is produced, like the CD-R, in such a manner that a substrate for recording the information in which a recording layer is disposed on a substrate and a reflective layer is disposed on the recording layer, is laminate with a substrate having the same form as the above-noted substrate for recording the information. In this case, the recording layer comprises a dye material.

With respect to the CD-R, the recording layer comprises a dye material and one of the characteristics of the CD-R is to have a high reflectance (65%) satisfying the CD standard; however, for obtaining a higher reflectance with the above-noted composition of the DVD+R, it is necessary that the recording layer can satisfy a specified complex refractive index at a wavelength of a light used for recordation and reproduction and the light absorption characteristics of the dye can satisfy the above-noted necessity. Also with respect to the DVD, the above-noted necessity is necessary.

With respect to the reproduction-only DVD, for enlarging the recording capacity, the reproduction-only DVD having two recording layers is proposed. For example, FIG. 1 is a cross-sectional view schematically showing a layers composition of the DVD having two recording layers. The first substrate 101 and the second substrate 102 are laminated to each other through the intermediate layer 105 comprising an UV-curing resin. On the inner surface of the first substrate 101, the first recoding layer 103 is disposed and on the inner surface of the second substrate 102, the second recoding layer 104 is disposed. The first recoding layer 103 is disposed as a semitransparent film of a dielectric film or the like. The second recoding layer 104 is disposed as a reflective film of a metal film or the like. In the first recoding layer 103, a recording mark in the form of concavo-convex is formed and by an effect of reflecting or interfering a reproduction laser, a recording signal is read. In the DVD shown in FIG. 1, the signal is read in the two recording layers, so that the DVD can obtain a memory capacity of 8.5 GB at most.

The first substrate 101 and the second substrate 102 have respectively a thickness of about 0.6 mm and the intermediate layer 105 has a thickness of about 50 µm. The first recording layer 103 as a semitransparent film is so disposed that the first recording layer 103 has a reflectance of around 30% and a laser light irradiated for reproducing the second recording layer 104 is damped in the first recording layer 103 through the reflection of about 30% of all light amount of the laser. Thereafter, the damped laser is reflected at the second recording layer 104 (as a reflective film) and after the laser is damped once again at the first recording layer 103, the laser gets out of the optical recording medium. By focusing the laser as a reproduction light so that the laser is brought to focus on the first recording layer 103 or the second recording layer 104 and by detecting the reflected light, a signal of each of the recording layers 103 and 104 can be reproduced. With respect to the DVD, the laser used for recordation and reproduction has a wavelength of generally about 650 nm.

However, up to date, with respect to a recordable DVD (e.g., DVD+R, DVD-R and DVD+RW), there is present only a recording medium having only one recording layer which can be read from one surface of the recording medium and for obtaining a larger memory capacity with using such an optical recording medium, it is necessary that the information can be reproduced and read from the both surfaces of the recording medium. This is because, since an optical recording medium in which recordation and reproduction are performed in two recording layers by irradiating a light to one surface of the medium, has two recording layers, when a signal is recorded by irradiating the laser which is brought to focus on the second recording layer (more distant from the optical pick up than the first recording layer), the laser is damped in the first recording layer, so that a disadvantage is caused wherein the light absorbance and the light reflectance in the second recording layer, which are required for recording the second recording layer cannot be compatibilized.

For example, Patent Literature 1 proposes an optical information medium which is constructed to be able to record in both two recording layers comprising an organic dye by irradiating the light to one surface of the optical information medium and the reproduction thereof can be performed also in both two recording layers by irradiating the light to one surface of the optical information medium. However, in this proposal, proposed is only an optical recording medium produced by laminating such two substrates to each other, as a first substrate in which recordation is performed by irradiating the laser to the surface of the substrate and a second substrate in which recordation is performed by irradiating the laser to the surface of the second recording layer, and the above-noted disadvantage in which the light absorbance and light reflectance in the second recording layer which are required for recording the second recording layer can be difficultly compatibilized, can not be solved. In this patent document, there is not disclosed a result of studying the recording signal with respect to the above-noted recording medium. Further, with respect to the second recording layer of the above-noted recording medium, since the layers composition around the second recording layer of the above-noted recording medium differs from the layers composition around the recording layer of a conventional CD-R or DVD+R, a disadvantage is caused wherein the recording mark can be difficultly formed in the second recording layer of the above-noted recording medium. This is because, since a conventional recording and reproducing medium having one recording layer comprises a substrate (to which the recording laser for the information is irradiated), recording layer (dye layer), reflective layer and protective layer in this order and the above-noted recording and reproducing medium having two recording layers comprises a laminating layer (to which the transmitted laser through the first recording layer is irradiated), inorganic protective layer, recording layer, reflective layer and substrate in this order, the recording mark forming environment (an adjacent layer of the recording layer) of the above-noted recording layer differs from that of the recording layer of a conventional recording medium. Therefore, with respect to the above-noted optical information medium disclosed in the above-noted patent document, there is a disadvantage wherein recording and reproducing properties, such as modulation factor and jitter, which correspond to a DVD system can be difficultly obtained.

Further, Patent Literatures 2 and 3 propose, with respect to the second recording layer of the recording and reproducing medium having two recording layers, an optical recording medium which comprises a laminating layer (to which the transmitted laser through the first recording layer is irradiated), inorganic protective layer, second recording layer, reflective layer and substrate in this order. However in these patent documents, there is disclosed only with respect to the presence of the recording mark (modulation factor) and the proposal thereof is the same proposal as that of the above-noted optical recording medium produced by laminating two substrates (first substrate in which recordation is performed by irradiating the light to the surface of the substrate and second substrate in which recordation is performed by irradiating the light to the surface of the recording layer) to each other, which is described in Patent Literature 1; therefore, by the above-noted proposal, the above-noted problem with respect to recordation and reproduction cannot be solved at all.

On the other hand, as a dye material used for disposing the recording layer of a DVD, a cyanine dye, azo dye and squarylium dye are put into practice. However, these organic dye materials have poor light resistance, therefore, in the case of disposing the recording layer using particularly a cyanine dye or squarylium dye, by using these dyes in combination with a light-resisting agent, such as an aluminum compound, a bisthiol metal complex and a formazane compound, the practical light-resistance of the recording layer is secured. For example, the squarylium metal chelate compound dye disclosed in Patent Literatures 4 and 5 is excellent in disc recording properties. However, for securing satisfactorily the light-resistance of the recording layer, it is proposed that the recording layer is disposed using the squarylium metal chelate compound dye in combination with various light-resisting agents (see Patent Literatures 6 to 9). However in this case, when a light-resisting agent is incorporated in the composition of the recording layer, the optical properties and thermal decomposition properties of the film as the recording layer are changed, thus a disadvantage is caused wherein while the practical light-resistance of the recording layer can be secured, the recording and reproducing performance of the recording layer is lowered.

Therefore, an optical recording medium comprising a first recording layer and a second recording layer; in which recordation and reproduction are performed in two recording layers and also in the second recording layer which is located more distant from the substrate to which the laser is irradiated than the first recording layer, advantageous recording signal properties can be obtained; and which is excellent in light-resistance, is not yet provided and the prompt development thereof is desired nowadays.

Patent Literature 1 Japanese Patent Application Laid-Open (JP-A) No. 11-66622

Patent Literature 2 Japanese Patent Application Laid-Open (JP-A) No. 2000-311384

Patent Literature 3 Japanese Patent Application Laid-Open (JP-A) No. 2003-331473

Patent Literature 4 International Publication No. WO01/44233

Patent Literature 5 International Publication No. WO01/44375

Patent Literature 6 Japanese Patent Application Laid-Open (JP-A) No. 2002-370451

Patent Literature 7 Japanese Patent Application Laid-Open (JP-A) No. 2002-370452

Patent Literature 8 Japanese Patent Application Laid-Open (JP-A) No. 2002-370453

Patent Literature 9 Japanese Patent Application Laid-Open (JP-A) No. 2002-370454

DISCLOSURE OF INVENTION

The object of the present invention is to provide an optical recording medium comprising a first recording layer and a second recording layer, in which the recordation and reproduction are performed in two recording layers and in the second recording layer which is located more distant from the substrate to which the laser is irradiated than the first recording layer, advantageous recording signal properties can be obtained, and which is excellent in light-resistance; and an optical recording and reproducing method and an optical recording apparatus using the above-noted recording medium.

The means for performing the above-noted task are as follows.

<1> An optical recording medium comprising:

a first substrate, a first information layer, an intermediate layer, a second information layer, and a second substrate in this order, wherein the first information layer comprises a first recording layer disposed on the first substrate and the second information layer comprises a reflective layer, a second recording layer comprising an organic dye and a protective layer which are disposed on the second substrate in this order; and the second recording layer comprises an organic dye which is at least one selected from the group consisting of squarylium metal chelate compounds represented by the following Formula (1):

$$\text{a-M-b} \atop |\ \ \ \ \ \ \ \ \ \ \ \ \text{Formula (1)} \atop (c)_m$$

wherein M represents a metal atom having a coordination function; m is an integer of 0 or 1; and when m is 0, a and b may be the same as or different from each other, and represent a squarylium dye ligand represented by the following Formula (2), or when m is 1, a, b and c may be the same as or different from each other, and represent a squarylium dye ligand represented by the following Formula (2):

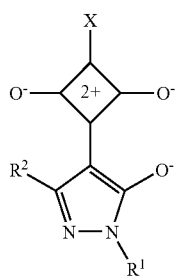

Formula (2)

wherein $R^1$ and $R^2$ may be the same as or different from each other, and represent any one of an alkyl group which may be substituted, an aralkyl group which may be substituted, an aryl group which may be substituted and a heterocyclic group which may be substituted; and X represents any one of an aryl group which may be substituted, a heterocyclic group which may be substituted and a $Z_3$=CH— group ($Z_3$ represents a heterocyclic group which may be substituted).

<2> The optical recording medium according to item <1> above, wherein X is a group represented by the following Formula (3):

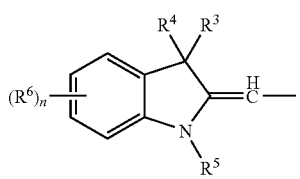

Formula (3)

wherein $R^3$ and $R^4$ may be the same as or different from each other, and represent an alkyl group which may be substituted, and $R^3$ and $R^4$ are taken together with an adjacent carbon atom to form an alicyclic hydrocarbon ring which may be substituted; $R^5$ represents any one of a hydrogen atom, an alkyl group which may be substituted, an aralkyl group which may be substituted and an aryl group which may be substituted; $R^6$ represents any one of a halogen atom, a nitro group, a cyano group, an alkyl group which may be substituted, an aralkyl group which may be substituted, an aryl group which may be substituted and an alkoxy group which may be substituted; and n is an integer of 0 to 4 and when n is an integer of 2 to 4, plural $R^6$s may be the same as or different from each other, and $R^6$s are taken together with two adjacent carbon atoms to form an aromatic ring which may be substituted.

<3> The optical recording medium according to item <2> above, wherein $R^6$ in Formula (3) is an alkoxy group.

<4> The optical recording medium according to item <1> above, wherein X is a group represented by the following Formula (4):

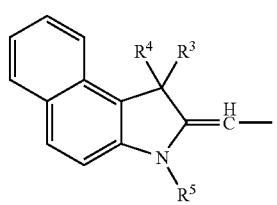

Formula (4)

wherein $R^3$ and $R^4$ may be the same as or different from each other, and represent an alkyl group which may be substituted, and $R^3$ and $R^4$ are taken together with an adjacent carbon atom to form an alicyclic hydrocarbon ring which may be substituted; and $R^5$ represents any one of a hydrogen atom, an alkyl group which may be substituted, an aralkyl group which may be substituted and an aryl group which may be substituted.

<5> The optical recording medium according to any one of items <1> to <4> above, wherein the second recording layer has a thickness of 50 nm to 100 nm. In the optical recording medium according to item <5>, by disposing the second recording layer having a thickness of 50 nm to 100 nm, more advantageous recording signal properties of the optical recording medium can be obtained.

<6> The optical recording medium according to any one of items <1> to <5> above, wherein the first recording layer comprises a reflective film and is for reproduction-only.

<7> The optical recording medium according to any one of items <1> to <5> above, wherein the first information layer comprises the first recording layer comprising an organic dye and a first reflective layer which are disposed on the first substrate in this order.

<8> The optical recording medium according to item <7> above, wherein the first recording layer comprises a light-resisting agent.

<9> The optical recording medium according to item <8> above, wherein the organic dye is a squarylium metal chelate compound and the light-resisting agent is a formazan metal chelate compound.

<10> The optical recording medium according to any one of items <1> to <9> above, wherein the protective layer comprises a thickness of 80 nm to 180 nm.

<11> The optical recording medium according to any one of <1> to <10> above, wherein the protective layer comprises ZnS.

In the optical recording medium according to any one of items <7>, <10> and <11> above, by protecting the second recoding layer with the reflective layer and the protective layer, the photo-oxidative degradation of the second recording layer can be prevented, so that without incorporating a light-resisting agent in the composition of the second recording layer, the practical light resistance of the optical recording medium can be obtained.

<12> The optical recording medium according to any one of items <1> to <11> above, wherein the second substrate comprises a guide groove having a depth of 20 nm to 60 nm.

In the optical recording medium according to item <12>, by forming a guide groove having a depth of 20 nm to 60 nm in the second substrate, more advantageous reflecting properties of the optical recording medium can be obtained.

<13> A recording method and reproducing method of an optical recording medium comprising:
performing at least one of recording and reproducing signal information in the first recording layer and the second recording layer by irradiating a light having a wavelength of 580 nm to 720 nm which is used for recordation, to the surface of the first substrate in the optical recording medium,
wherein the optical recording medium is the optical recording medium according to any one of items <1> to <12> above.

In the optical recording method and optical reproducing method according to item <13>, the crosstalk amount of the recording mark can be suppressed and also in the second recording layer, advantageous recording signal properties can be obtained, so that recordation and reproduction can be stably performed.

<14> An optical recording apparatus comprising:
a light source from which a light is irradiated to an optical recording medium for recording information in the optical recording medium,
wherein the optical recording medium is the optical recording medium according to any one of items <1> to <12> above.

In the optical recording apparatus according to item <14>, the optical recording medium is excellent in light-resistance and also in the second recording layer, advantageous recording signal properties can be obtained, so that the recording can be stably performed.

DESCRIPTION OF THE PREFERRED EMBODIMENTS

Optical Recording Medium

Figure 1:
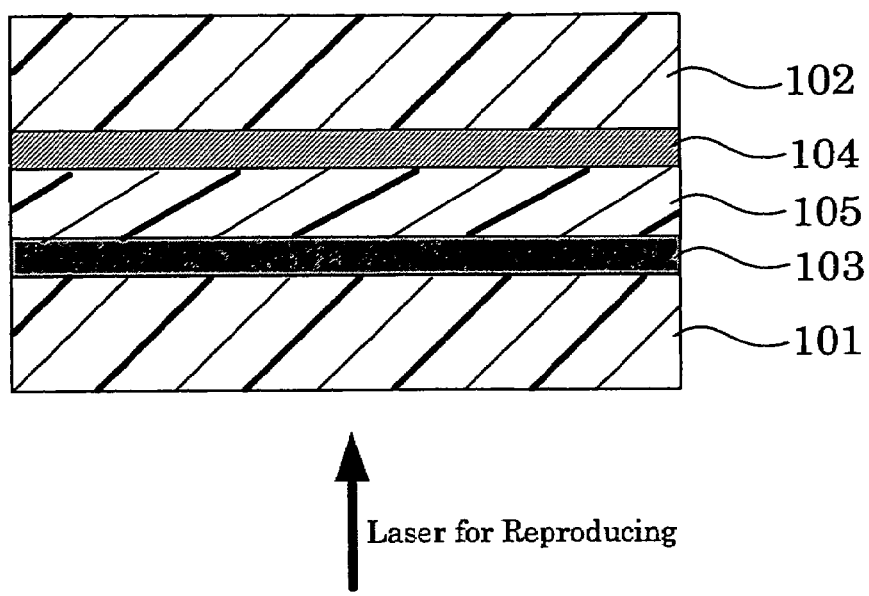
FIG. 1 is a sectional view schematically showing an example of the layers composition of a conventional optical recording medium.

The optical recording medium according to the present invention comprises a first substrate, a first information layer, an intermediate layer, a second information layer and a second substrate in this order; and optionally other layers.

According to the first aspect of the present invention, the first information layer comprises a first recording layer which is disposed on the first substrate and comprises a reflective film and in which information pits for reproduction-only are formed; and optionally other layers.

According to the second aspect of the present invention, the first information layer comprises a first recording layer comprising an organic dye and a first reflective layer which are disposed on the first substrate in this order; and optionally a protective layer, an undercoat layer, a hard coat layer and other layers.

According to the present invention, the second information layer comprises a reflective layer, a second recording layer comprising an organic dye, and a protective layer which are disposed on the second substrate in this order; and optionally, an undercoat layer, a hard coat layer and other layers.

In the above-noted optical recording medium, at least one of recording and reproducing signal information in the first and second recording layers is performed by irradiating the light for recordation which has a wavelength of 580 nm to 720 nm to the surface of the first substrate of the optical recording medium.

In the optical recording medium having two recording layers, such as a first recording layer and a second recording layer, when the recording mark is formed in the second recording layer by irradiating the light for recordation and reproduction, which is damped in the above-noted first recording layer and first reflective layer (or the second reflective layer) to the second recording layer, in the comparison with a ROM (e.g., DVD-ROM), the light damping by the amount of the light which is damped in the first recording layer is caused. As the result of the light damping, the recording sensitivity in the second recording layer can be difficultly obtained. Further, in the second recording layer, the focus offset due to the optical aberration is easily caused and the recording mark is spread, thus a disadvantage is caused wherein the crosstalk to an adjacent track is easily increased. Further, with respect to the crosstalk, the form of the groove formed in the second substrate causes the increase of the crosstalk. In other words, when in the horizontal direction of the layers composition of the second information layer (see FIG. 5), a convex (or concave) part of the second recording layer is located corresponding to the location of a convex (or concave) part of the second substrate, wherein "convex (or concave)" means "convex (or concave) to (or from) the surface of the intermediate layer to which the laser is irradiated", the recording mark is formed in an intergroove part (convex part), so that the effect of preventing the spread of the recording mark by the groove cannot be obtained. Even when the recording mark is formed in the intergroove part, the main reflecting surface of the second recording layer is the interface between the second recording layer and the second reflective layer and accordingly, for obtaining the reflectance of the second recording layer compared to that of the first recording layer, it is necessary that the depth of the groove in the second substrate is lessen than that in the first substrate, so that there is such a tendency that in the second recording layer, the crosstalk is easily increased.

Therefore, in the present invention, for obtaining advantageous signal properties of the optical recording medium by suppressing the recording sensitivity of the second recording layer and the spread of the recording mark in the second recording layer, the following countermeasures are preferred. (i) the second recording layer comprises one selected from the group consisting of the squarylium metal chelate compounds having a specified structure, (ii) for preventing the thermal deformation of the optical recording medium, a protective layer is disposed as a deformation-preventing layer adjacent to the second recording layer and (iii) for obtaining a high reflectance in the second recording layer, the depth of the guide groove in the second substrate is rendered suitable.

The second recording layer according to the present invention comprises one selected from the group consisting of the squarylium metal chelate compounds represented by the following Formula (1) and optionally other components. Among them, a squarylium metal chelate compound having a bezoindolenine group or an alkoxy group is most preferred, because the compound is thermally decomposed at a high speed and the second recording layer produced using the compound has a small crosstalk.

Formula (1)

wherein M represents a metal atom having a coordination function; m is an integer of 0 or 1; and when m is 0, a and b may be the same as or different from each other, and represent a squarylium dye ligand represented by the following Formula (2), or when m is 1, a, b and c may be the same as or different from each other, and represent a squarylium dye ligand represented by the following Formula (2):

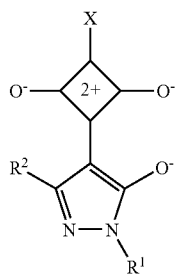

Formula (2)

wherein $R^1$ and $R^2$ may be the same as or different from each other, and represent any one of an alkyl group which may be substituted, an aralkyl group which may be substituted, an aryl group which may be substituted and a heterocyclic group which may be substituted; and X represents any one of an aryl group which may be substituted, a heterocyclic group which may be substituted and a $Z_3$=CH— group ($Z_3$ represents a heterocyclic group which may be substituted).

The above-noted X is preferably a group represented by the following Formula (3) or the following Formula (4).

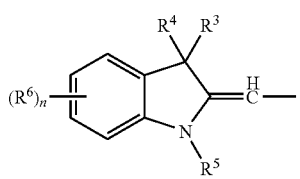

Formula (3)

wherein $R^3$ and $R^4$ may be the same as or different from each other, and represent an alkyl group which may be substituted, and $R^3$ and $R^4$ are taken together with an adjacent carbon atom to form an alicyclic hydrocarbon ring which may be substituted; $R^5$ represents any one of a hydrogen atom, an alkyl group which may be substituted, an aralkyl group which may be substituted and an aryl group which may be substituted; $R^6$ represents any one of a halogen atom, a nitro group, a cyano group, an alkyl group which may be substituted, an aralkyl group which may be substituted, an aryl group which may be substituted and an alkoxy group which may be substituted; and n is an integer of 0 to 4 and when n is an integer of 2 to 4, plural $R^6$s may be the same as or different from each other, and $R^6$s are taken together with two adjacent carbon atoms to form an aromatic ring which may be substituted.

Here in the Formula (3), $R^6$ is most preferably an alkoxy group.

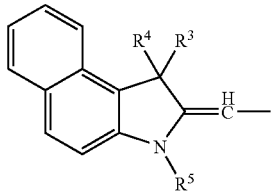

Formula (4)

wherein $R^3$ and $R^4$ may be the same as or different from each other, and represent an alkyl group which may be substituted, and $R^3$ and $R^4$ are taken together with an adjacent carbon atom to form an alicyclic hydrocarbon ring which may be substituted; and $R^5$ represents any one of a hydrogen atom, an alkyl group which may be substituted, an aralkyl group which may be substituted and an aryl group which may be substituted.

In the definition of the substituent in the above-noted formulae (1), (2), (3) and (4), examples of the above-noted alkyl group and the alkyl portion in the above-noted alkoxy group include a linear or branched $C_1$ to $C_6$ alkyl group and a $C_3$ to $C_8$ cyclic alkyl group. Specific examples thereof include a methyl group, an ethyl group, a propyl group, an isopropyl group, a butyl group, an isobutyl group, a sec-butyl group, a tert-butyl group, a pentyl group, an isopentyl group, a 1-methylbutyl group, a 2-methylbutyl group, a tert-pentyl group, a hexyl group, a cyclopropyl group, a cyclobutyl group, a cyclopentyl group, a cyclohexyl group, a cycloheptyl group and a cyclooctyl group.

The above-noted aralkyl group is preferably a $C_7$ to $C_{19}$ hydrocarbon group, more preferably a $C_7$ to $C_{15}$ hydrocarbon group. Specific examples thereof include a benzyl group, a phenetyl group, a phenylpropyl group and a naphthylmethyl group.

The above-noted aryl group is preferably a $C_6$ to $C_{18}$ hydrocarbon group, more preferably a $C_6$ to $C_{14}$ hydrocarbon group. Specific examples thereof include a phenyl group, a naphthyl group, an anthryl group and an azulenyl group.

Examples of the above-noted halogen atom include a chlorine atom, a bromine atom, a fluorine atom and an iodine atom.

Examples of the above-noted metal M having a coordination function include aluminum, zinc, copper, iron, nickel, chromium, cobalt, manganese, iridium, vanadium and titanium. Particularly, the optical recording medium according to the present invention produced using a squarylium metal chelate compound comprising aluminum has excellent optical properties.

Preferred examples of the above-noted aromatic ring which is formed according to a reaction in which $R^6$s are taken together with adjacent carbon atoms include a $C_6$ to $C_{14}$ aromatic ring. Specific examples thereof include a benzene ring and a naphthalene ring.

Examples of the heterocyclic ring in the above-noted heterocyclic group include a five-membered or six-membered monocyclic aromatic ring or five-membered or six-membered alicyclic heterocyclic ring comprising at least one selected from the group consisting of a nitrogen atom, an oxygen atom and a sulfur atom; and a dicyclic or tricyclic condensed aromatic or dicyclic or tricyclic alicyclic heterocyclic ring which is produced by condensing a three-membered to eight-membered ring and which comprises at least one selected from the group consisting of a nitrogen atom, an oxygen atom and a sulfur atom. Specific examples thereof include a pyridine ring, a pyradine ring, a pyrimidine ring, a pyridazine ring, a quinoline ring, an isoquinoline ring, a phthalazine ring, a quinazoline ring, a quinoxaline ring, a naphthyridine ring, a cinnoline ring, a pyrrole ring, a pyrazole ring, an imidazole ring, a triazole ring, a tetrazole ring, a thiophene ring, a furan ring, a thiazole ring, an oxazole ring, an indole ring, an isoindole ring, an indazole ring, a benzoimidazole ring, a benzotriazole ring, a benzothiazole ring, a bezooxazole ring, a purine ring, a carbazole ring, a pyrrolidine ring, a piperidine ring, a piperazine ring, a morpholine ring, a thiomorpholine ring, a homopiperidine ring, a homopiperazine ring, a tetrahydropyridine ring, a tetrahydroquinoline ring, a tetrahydroisoquinoline ring, a tetrahydrofuran ring, a tetrahydropyran ring, a dihydrobenzofuran ring and a tetrahydrocarbazole ring.

The alicyclic hydrocarbon group which is formed according to a reaction in which $R^3$ and $R^4$ are taken together with an adjacent carbon atom is preferably an unsaturated or saturated $C_3$ to $C_8$ hydrocarbon group. Specific examples thereof include a cyclopropane ring, a cyclobutane ring, a cyclopentane ring, a cyclohexane ring, a cycloheptane ring, a cyclooctane ring, a cyclopentene ring, a 1,3-cyclopentadiene ring, a cyclohexene ring and a cyclohexadiene ring.

Specific examples of the heterocyclic group ($Z_3$) of a $Z_3$=CH— group in the above-noted Formula (2) include an indoline-2-ylidene group, benzo[e]indoline-2-ylidene group, a 2-benzothiazolinylidene group, a naphto[2,1-d]thiazole-2 (3H)-ylidene group, a naphto[1,2-d]thiazole-2 (1H)-ylidene group, a 1,4-dihydroquinoline-4-ylidene group, a 1,2-dihydroquinoline-2-ylidene group, a 2,3-dihydro-1H-imidazo[4,5-d]quinoxaline-2-ylidene group and a 2-benzoselenazolinylidene group. Among them, a group represented by the following Formula (A) is preferred.

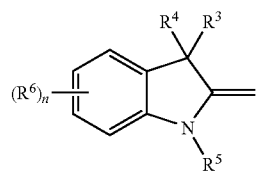

Formula (A)

wherein the groups $R^3$, $R^4$, $R^5$, and $R^6$ and the number n represent respectively the same groups and number as the groups $R^4$, $R^5$, and $R^6$ and number n in Formulae (3) and (4).

Examples of the substituent in the above-noted aralkyl group which may have a substituent, above-noted aryl group which may be substituted, above-noted alkoxy group which may be substituted, above-noted heterocyclic group which may be substituted, above-noted heterocyclic group $Z_3$ which may be substituted, above-noted aromatic ring which is formed according to a reaction in which $R^6$s are taken together with adjacent carbon atoms and which may be substituted and the above-noted alicyclic hydrocarbon ring which is formed according to a reaction in which $R^3$ and $R^4$ are taken together with an adjacent carbon atom and which may be substituted include the same or different 1 to 5 substituents as or from each other selected from the group consisting of a hydroxyl group, a carboxyl group, a halogen atom, an alkyl group, an alkoxy group, a nitro group and an unsubstituted or substituted amino group. Examples of the halogen atom, alkyl group and alkoxy group include the same as the above-exemplified halogen atoms, alkyl groups and alkoxy groups.

Examples of the substituent of the above-noted alkyl group which may be substituted include the same or different 1 to 3 substituents as or from each other selected from the group consisting of a hydroxyl group, a carboxyl group, a halogen atom and an alkoxy group. Examples of the halogen atom and alkoxy group include the same as the above-exemplified halogen atoms and alkoxy groups.

Examples of the substituent of the above-noted amino group which may be substituted include the same or different 1 to 2 alkyl groups as or from each other. Here, examples of the alkyl group include the above-exemplified alkyl groups.

Hereinbelow, with respect to the general manufacturing method of the squarylium metal chelate compound (1) represented by the above-noted Formula (1), explanations are given.

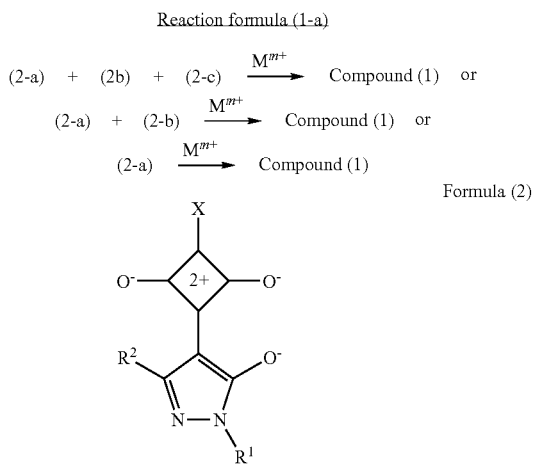

Formula (2)

wherein $R^1$ and $R^2$ may be the same as or different from each other, and represent any one of an alkyl group which may be substituted, an aralkyl group which may be substituted, an aryl group which may be substituted and a heterocyclic group which may be substituted; and X represents any one of an aryl group which may be substituted, a heterocyclic group which may be substituted and a $Z_3$=CH— group ($Z_3$ represents a heterocyclic group which may be substituted).

(2-a), (2-b) and (2-c) are examples of Compound (2) represented by Formula (2) which are different from each other, with proviso that when m is 0, the reaction formula (1-a) is not present.

Further, Compound (2) can be produced according to a method described in International Publication Nos. WO01/44233 and WO02/50190.

Compound (1) can be produced by reacting the compound (2-a) and optionally the compound (2-b) and compound (2-c) with a reaction material from which the ion $M^{m+}$ is generated in a solvent optionally in the presence of acetic acid at room temperature to 120° C. for 1 hour to 15 hours.

Examples of the above-noted reaction material from which the ion $M^{m+}$ is generated include tris-acetylacetonatoaluminum, tris-ethylacetylacetonatoaluminum, aluminum isopropoxide, aluminum sec-butoxide, aluminum ethoxide, aluminum chloride, copper chloride, copper acetate and nickel acetate.

Examples of the above-noted solvent include a halogenated solvent, such as chloroform and dichloromethane; an aromatic solvent, such as toluene and xylene; an ether solvent, such as tetrahydrofuran and methyl tert-butyl ether; an ester solvent, such as ethyl acetate; and alcohol solvent, such as methanol, ethanol, propanol, isopropyl alcohol and butanol. These solvents may be used individually or in combination.

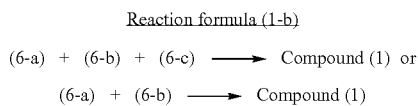

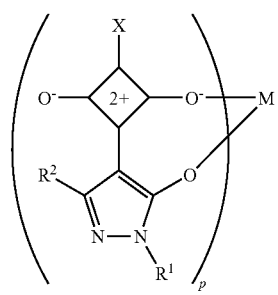

Formula (6)

wherein M is defined in Formula (1) and $R^1$, $R^2$ and X are defined in Formula (2); and p is an integer of 2 or 3.

(6-a), (6-b) and (6-c) are examples of Compound (6) represented by Formula (6) which are different from each other (Compound (6) is a compound represented by Formula (1), wherein all of the squarylium dye ligands a, b and c are the same).

Further, Compound (6) can be produced according to a method described in International Publication Nos. WO01/44233 and WO02/50190.

Compound (1) can be produced by reacting the compound (6-a) with the compound (6-b) and optionally compound (6-c) in a solvent at room temperature to 120° C. for 1 hour to 15 hours.

Examples of the above-noted solvent include a halogenated solvent, such as chloroform and dichloromethane; an aromatic solvent, such as toluene and xylene; an ether solvent, such as tetrahydrofuran and methyl tert-butyl ether; an ester solvent, such as ethyl acetate; and an alcohol solvent, such as methanol, ethanol and 2,2,3,3-tetrafluoropropanol.

Specific examples of the squarylium metal chelate compounds (1) represented by Formula (1) include the compounds represented by the following formulae:

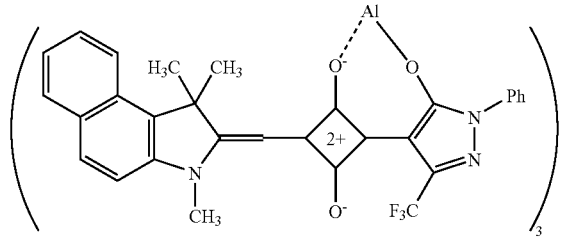

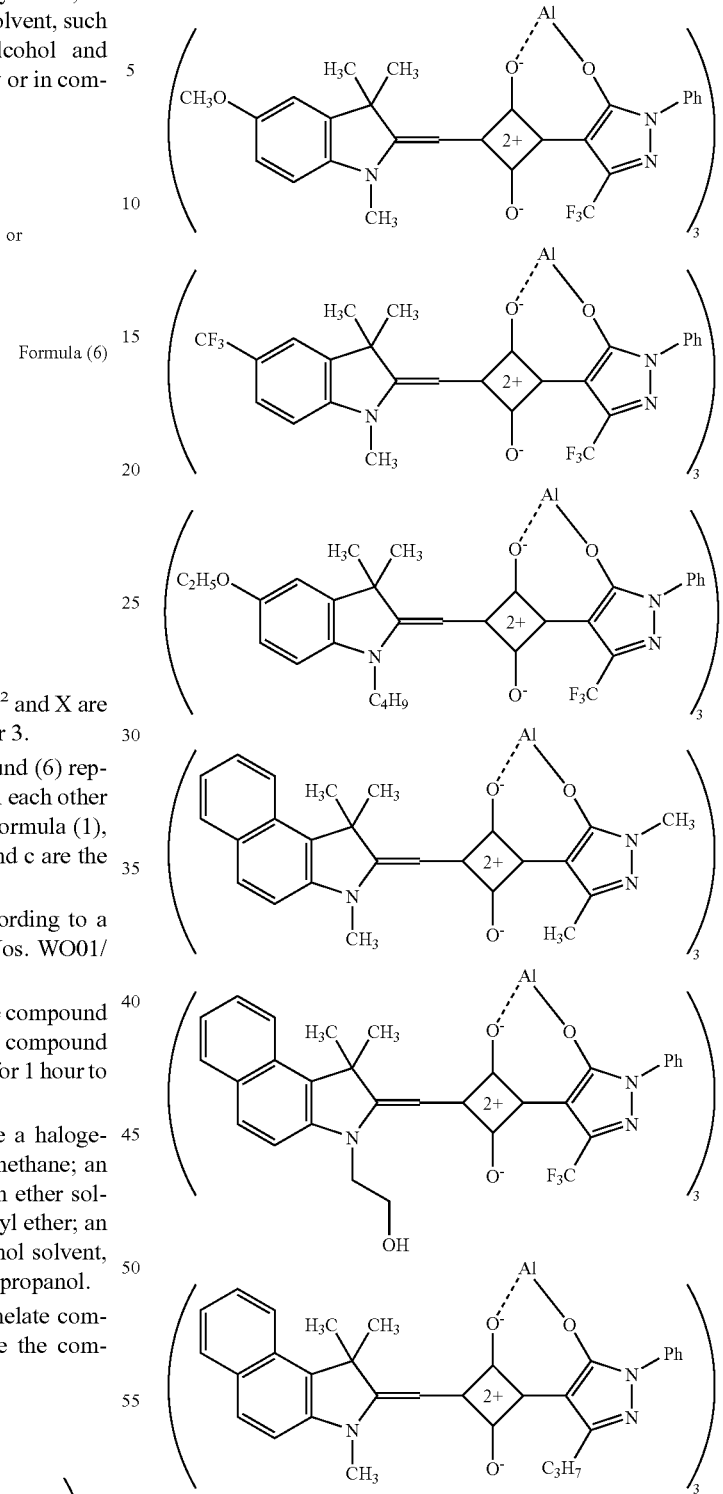

wherein Ph represents a phenyl group.

According to the present invention, the organic dye (a squarylium metal chelate compound dye represented by Formula (1)) used for disposing the second recording layer has a thermal decomposition temperature of preferably 250° C. to 350° C. When the thermal decomposition temperature is 350° C. or less, the recording sensitivity of the second recording layer is more improved. On the other hand, when the thermal decomposition temperature is 250° C. or more, not only the thermal stability of the second recording layer is more improved, but also the recording mark is difficultly spread in the second recording layer. Here, the thermal decomposition temperature of the organic dye can be easily measured using, for example a conventional thermal balance.

The second recording layer has a thickness of preferably 50 nm to 100 nm (500 angstrom to 1,000 angstrom), more preferably 60 nm to 90 nm. When the thickness of the second recording layer is 50 nm or more, more advantageous jitter properties of the optical recording medium can be obtained. On the other hand, when the thickness of the second recording layer is 100 nm or less, the crosstalk and jitter of the optical recording medium is difficultly increased. The ratio of the thickness of the second recording layer in the guide groove part to the thickness of the second recording layer in the intergroove part is preferably 80% to 100%.

Figure 6:
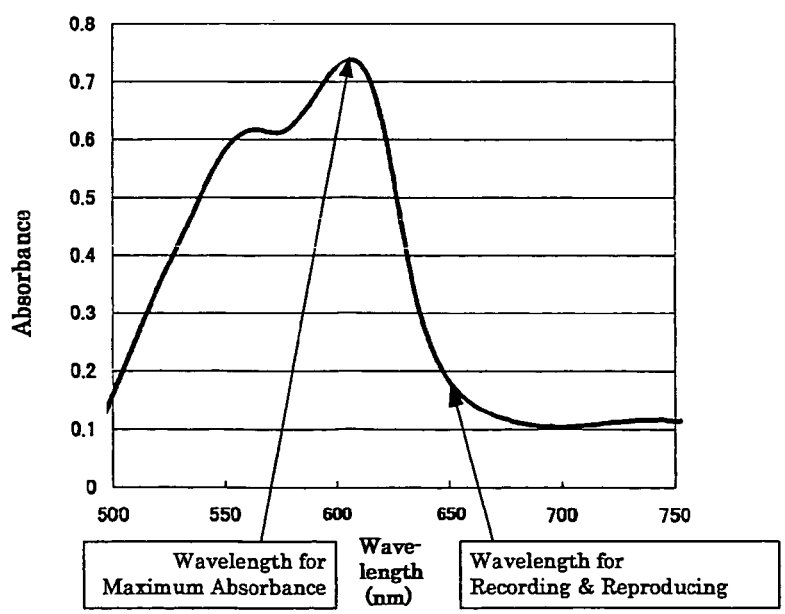
FIG. 6 is a graph showing an absorbance spectrum of a dye used for disposing the recording layer in Absorbance versus Wave length of the light used for recordation and reproduction.

The light absorption by the second recording layer can be controlled by the thickness of the second recording layer or by the light absorption properties of the organic dye. In the optical recording medium according to the present invention, as shown in FIG. 6, the organic dye (a squarylium metal chelate compound dye represented by Formula (1)) used for disposing the second recording layer has the light wavelength corresponding to the maximum light absorbance or the light wavelength corresponding to the light absorbance peak of preferably 580 nm to 620 nm. When the light wavelength corresponding to the maximum light absorbance or the light wavelength corresponding to the light absorbance peak of the organic dye is in the above-noted range, the recording sensitivity of the second recording layer is preferred from the viewpoint of the reflectance of the second recording layer.

Since the protective layer disposed on the second recording layer has the effect as a barrier layer protecting the second recording layer from the intermediate layer, by using an adhesive dissolving the organic dye, as the intermediate layer, two substrates can be easily laminated to each other.

Preferred examples of the material used for disposing the protective layer include an inorganic substance having a high light transmittance, such as SiO, $SiO_2$, $MgF_2$, $SnO_2$, SnS, ZnS, ZnS—$SiO_2$. Among them, a material comprising mainly ZnS which has a low crystallinity and a high refractive index is most preferred.

Preferred examples of the material comprising mainly ZnS include ZnS—$SiO_2$, ZnS—SiC, ZnS—Si, ZnS—Ge, ZnS—ZnO—GaN, ZnS—ZnO—$In_2O_3$—$Ga_2O_3$. The content ratio of ZnS in the material comprising mainly ZnS is preferably 60 mol % to 90 mol %, from the viewpoint of the crystallinity of the material.

The thickness of the protective layer is not restricted and may be properly selected depending on the application. The thickness is preferably 80 nm to 180 nm (800 angstrom to 1,800 angstrom). When the thickness of the protective layer is 80 nm (800 angstrom) or more, satisfactory recording signal modulation factor (contrast) can be obtained. The thickness of the protective layer is preferably 180 nm (1,800 angstrom) or less from the viewpoint of the function of the protective layer as the deformation preventing layer.

Further, the guide groove in the second substrate has the depth of preferably 20 nm to 60 nm (200 angstrom to 600 angstrom). By forming the guide groove having a depth in the above-noted range in the second substrate, the damping of the reflected light by the guide groove formed in the second substrate can be easily suppressed, so that a high reflectance in the second recording layer can be easily obtained.

Figure 4:
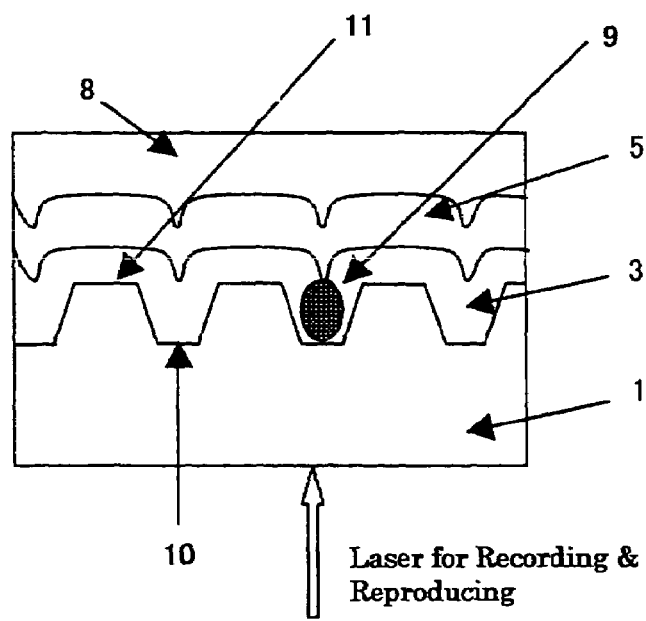
FIG. 4 is a sectional view schematically showing an example of the layers composition of the first information layer in the optical recording medium according to the present invention.
Figure 5:
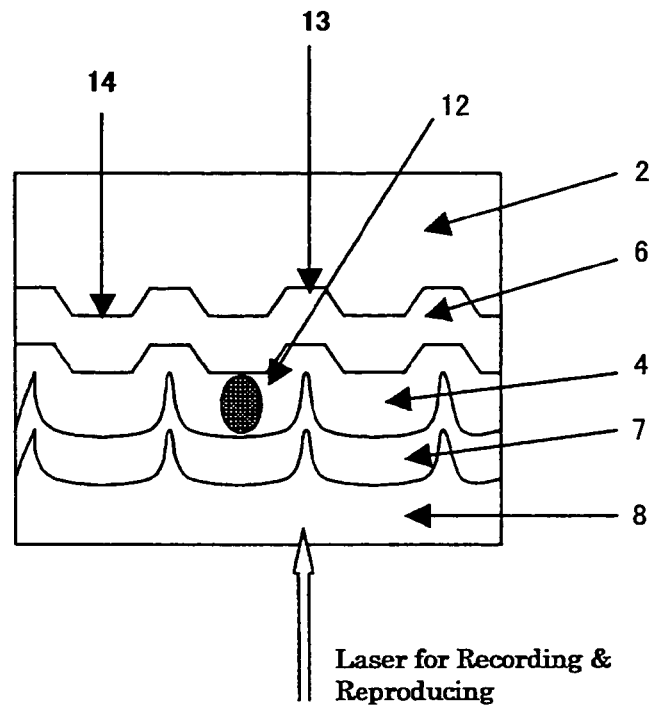
FIG. 5 is a sectional view schematically showing an example of the layers composition of the second information layer in the optical recording medium according to the present invention.

Here, examples of the layers composition of the optical recording medium according to the present invention are schematically shown in FIGS. 4 and 5. In FIG. 4, the first information layer is shown and the recording mark forming portion 9 formed in the first information layer is formed in the groove part 10 of the first substrate.

In FIG. 5, the second information layer is shown and the recording mark forming portion 12 formed in the second information layer is formed in the intergroove part 14 of the second substrate.

As shown in FIGS. 4 and 5, the form of the groove formed in the first substrate differs from the form of the groove formed in the second substrate. For example, with respect to a DVD+R or DVD-R having a memory capacity of 4.7 GB and a track pitch of 0.74 μm, the groove of the first substrate has a depth of preferably 150 nm to 200 nm (1,500 angstrom to 2,000 angstrom) and a width (at the bottom of the groove) of preferably 0.1 μm to 0.35 μm. This is because, as shown in FIG. 4, when the first recording layer is disposed according to a spinning coating film formation, since there is such a tendency that the organic dye is filled in the groove of the first substrate and accordingly the form of the interface between the first recording layer and the first reflective layer is specified depending on the filled amount of the coating liquid and the form of the groove in the first substrate, for utilizing the interface reflection, the above-noted range of the depth and width of the groove formed in the first substrate is suitable.

As shown in FIG. 5, also since the form of the interface between the second recording layer and the second reflective layer is specified depending on the filled amount of the coating liquid and the form of the groove in the second substrate, for utilizing the interface reflection, the above-noted range of the depth and width of the groove formed in the second substrate is suitable. For the wavelength (about 650 nm) of the light used for recordation and reproduction in a DVD, the guide groove of the second substrate has a width (at the bottom of the groove) of preferably 0.1 μm to 0.35 μm. When the groove width is 0.1 μm or more, the reflectance in the second recording layer is difficultly lowered sometimes. On the other hand, when the groove width is 0.35 μm or less, the form of the recording mark can be easily uniformized, so that the jitter of the optical recording medium is difficultly increased sometimes.

Next, with respect to the layers composition of the optical recording medium according to the present invention, explanations are given with referring to figures attached.

Figure 2:
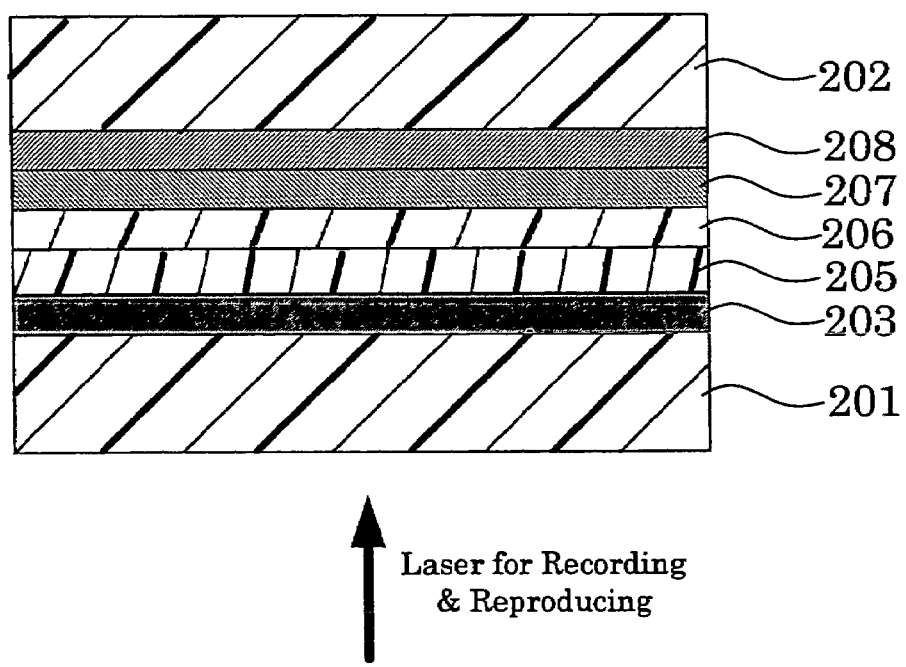
FIG. 2 is a sectional view schematically showing an example of the layers composition of the optical recording medium according to the present invention.

FIG. 2 is a section view schematically showing an example of the layers composition of the optical recording medium according to the first aspect of the present invention. In the example shown in FIG. 2, the first recording layer 203 is used only for reproduction thereof and the second recording layer 207 is used for recordation and reproduction thereof. In FIG. 2, 201 represents the first substrate, 202 represents the second substrate, 203 represents the first recording layer used only for reproduction thereof which comprises a reflective film, 205 represents the intermediate layer, 206 represents the protective layer, 207 represents the second recording layer comprising an organic dye, 208 represents the reflective layer; and recordation and reproduction are performed by irradiating the light to the surface of the first substrate.

Figure 3:
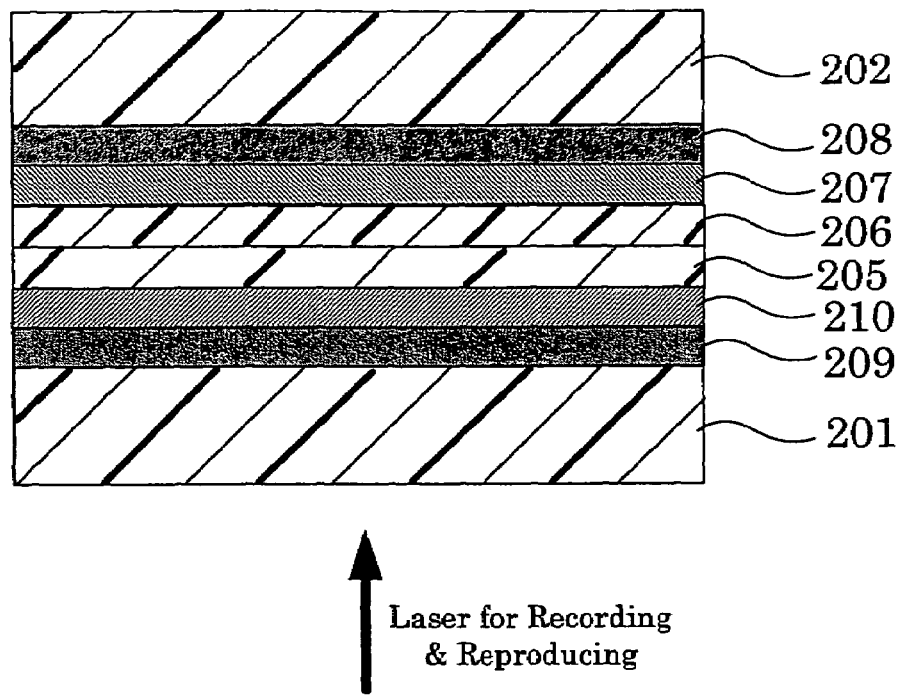
FIG. 3 is a sectional view schematically showing another example of the layers composition of the optical recording medium according to the present invention.

FIG. 3 is a section view schematically showing an example of the layers composition of the optical recording medium according to the second aspect of the present invention. In the example shown in FIG. 3, both the first recording layer 209 and the second recording layer 207 are used for recordation and the reproduction thereof. In FIG. 3, 201 represents the first substrate, 209 represents the first recording layer comprising an organic dye, 210 represents the first reflective layer, 202 represents the second substrate, 205 represents the intermediate layer, 206 represents the protective layer, 207 represents the second recording layer comprising an organic dye, 208 represents the second reflective layer; and recordation and reproduction are performed by irradiating the light to the surface of the first substrate.

According to the present invention, with respect to the examples shown in FIGS. 2 and 3, an optical recording medium comprising only one recording layer produced by eliminating the first recording layer from the examples, may be also used.

The layer composition of the optical recording medium according to the present invention is a layer composition for obtaining a high reflectance in the recording layer comprising an organic dye (a dye recording layer), like a DVD+R or a CD-R, by a multi-interfering effect at the both interfaces of the recording layer. The recording layer has preferably a large refractive index n and a relative small extinction coefficient k, more preferably n which is more than 2 and k which is less than 0.2 and more than 0.03. Such optical properties of the recording layer can be obtained by utilizing properties of the terminal of the longer wavelength range in the light absorbance wavelength zone.

—Recording Layer—

According to the present invention, examples of the first recording layer in the first information layer include a first recording layer comprising a reflective film, which is used only for reproduction thereof and a first recording layer comprising an organic dye. The second recording layer in the second information layer comprises, as noted above, a squarylium metal chelate dye compound represented by Formula (1).

The above-noted reflective film comprises a film produced using the same metal or metal alloy as that used for disposing the below-noted reflective layer and in the reflective film, an information pit is formed.

The organic dye used for disposing the first recording layer is not restricted and may be properly selected depending on the application. Examples of the organic dye include a cyanine dye, a tetraazaporphyarzine dye, a phthalocyanine dye, a pyrylium/thiopyrylium dye, an azulenium dye, a squarylium dye, a squarylium metal chelate compound dye, a formazan chlate dye, a metal (such as Ni and Cr) complex salt dye, a naphtoquinone/anthraquinone dye, an indophenol dye, an indoaniline dye, a triphenylmethane dye, a triallylmethane dye, an aminium/diimmonium dye and a nitroso compound dye. These dyes may be used individually or in combination.

Among them, from the viewpoint of easiness for obtaining desired optical properties at a wavelength of the laser light (about 650 nm) which is present in the near of a wavelength range of 580 nm to 620 nm in which a wavelength corresponding to the maximum light absorbance or the light absorbance peak by the recording layer comprising the organic dye, is present; film formation properties of the recording layer disposed by the solvent coating; and easiness for controlling optical properties of the recording layer, at least one dye selected from the group consisting of a tetraazaporphyrazine dye, a cyanine dye, an azo dye, a squarylium dye, a squarylium metal chelate compound dye and a formazan chelate dye is preferred.

Further, when the first recording layer is an organic dye recording layer, the first recording layer comprises preferably a light-resistant agent. The light-resisting agent is not restricted and may be properly selected depending on the application. When the composition of the first recording layer comprises a squarylium dye, examples of the light-resistant agent include an aluminum compound, a bisthiol metal complex and a formazan metal chelate compound. Among them, the formazan metal chelate is most preferred.

The first recording layer has a thickness of preferably 10 nm to 500 nm (100 angstrom to 5,000 angstrom), more preferably 40 nm to 80 nm (400 angstrom to 800 angstrom). When the thickness of the first recording layer is 10 nm or more, the recording sensitivity of the first recording layer is more improved. On the other hand, when the thickness is 500 nm or less, the reflectance in the first recording layer is more improved sometimes.

The first recording layer can be disposed according to a conventional method, such as a metallizing method, a sputtering method, a CVD (chemical vapor deposition) method and a liquid coating method. Among them, for disposing the first recording layer according to the first aspect of the present invention, a metallizing method, a sputtering method and a CVD (chemical vapor deposition) method are preferred and for disposing the first recording layer according to the second aspect of the present invention, the liquid coating method is preferred. The first recording layer can be also disposed according to the below-noted manufacturing method of the optical recording medium according to the present invention.

The second recording layer can be disposed according to a conventional method, such as a metallizing method, a sputtering method, a CVD (chemical vapor deposition) method and a liquid coating method. Among them, the liquid coating method is preferred. The second recording layer can be also disposed according to the below-noted manufacturing method of the optical recording medium according to the present invention.

Further, the first and second recording layers may comprise optionally other components, such as a polymer material, a stabilizer, a dispersant, a flame-retardant, a lubricant, an anti-static agent, a surfactant and a plasticizer.

Examples of the polymer material include an ionomer resin, a polyamide resin, a vinyl resin, a natural polymer, a silicon resin, a liquid rubber and a mixture thereof with a silane coupling agent dispersed therein. Examples of the stabilizer include a transition metal complex.

—Substrate—

The substrate should be transparent to the used laser only in the case of performing recordation and reproduction by irradiating the laser to the surface of the substrate, and in the case of performing recordation and reproduction by irradiating the laser to the surface of the recording layer, the substrate is not necessary to be transparent. Therefore, since in the present invention, a light for recordation which has a wavelength of 580 nm to 720 nm is irradiated to the surface of the first substrate, so long as the first substrate is transparent, it is no problem whether the second substrate is transparent or not.

The material for the substrate is not restricted and may be properly selected depending on the application. Examples of the material for the substrate include a plastic, such as a polyester resin, an acrylic resin, a polyamide resin, a polycarbonate resin, a polyolefin resin, a phenol resin, an epoxy resin and a polyimide resin; a glass; a ceramic; and a metal.

The substrate has usually the form of a disc and the track pitch formed on the substrate has a size of usually preferably 0.7 µm to 1.0 µm, for the optical recording medium having a large capacity preferably 0.7 µm to 0.8 µm.

—Reflective Layer—

As a material used for disposing the reflective layer, a material having a higher reflectance at the wavelength of the used laser is preferred and examples of the preferred material include a metal or a semi-metal, such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ca, In, Si, Ge, Te, Pb, Po, Sn, Si and SiC. Among them, from the viewpoint of obtaining a higher reflectance, Au, Ag and Al are most preferred. These materials may be used individually or in combination, or as an alloy thereof.

The reflective layer has a thickness of preferably 5 nm to 300 nm (50 angstrom to 3,000 angstrom), more preferably 5 nm to 30 nm (5 angstrom to 300 angstrom), still more preferably 10 nm to 15 nm (100 angstrom to 150 angstrom). Either in the case where the first recording layer comprises a reflective film used only for reproduction thereof, or in the case where the first recording layer comprises an organic dye and further, the reflective layer is disposed on the first recording layer, it is preferred that the thickness of the reflective layer is so controlled that the light transmittance of the reflective layer can be 40% or more. It is preferred that when the reflective layer has a smaller thickness, the light transmittance of the reflective layer is difficultly damped. Particularly, from the viewpoint of a material comprising mainly Ag having the highest reflection and transmission efficiency and of securing the durability of the optical recording medium with using the above-noted range of the thickness of the reflective layer, an alloy produced by incorporating a slight amount of a metal, such as Nd, Cu, Pd, and In in Ag is preferred. The amount of the metal incorporated in Ag is preferably 0.2% by mass to 2% by mass, based on the mass of Ag.

The thickness of the reflective layer (second reflective layer) is not restricted and may be properly selected depending on the application. The thickness of the reflective layer is preferably 100 nm to 300 nm (1,000 angstrom to 3,000 angstrom).

—Hard Coat Layer in Substrate Surface—

The above-noted hard coat layer in the surface of the substrate is used for such purposes as (1) protecting the recording layer (absorbing layer of a reflected light) from scratch, dust and dirt, (2) improving the preservation stability of the recording layer (absorbing layer of a reflected light) and (3) improving the reflectance. For these purposes, an inorganic material or an organic material which is shown in the below-noted section of the undercoat layer can be used. Examples of the preferred inorganic material include SiO and $SiO_2$. Examples of the preferred organic material include a polymethylacrylate resin; a polycarbonate resin; an epoxy resin; a polystyrene resin; a polyester resin; a vinyl resin; a cellulose; an aliphatic hydrocarbon resin; an aromatic hydrocarbon resin; a natural rubber; a styrene-butadiene resin; a chloroprene rubber; a wax; an alkyd resin; a heat-softening resin, such as a drying oil and a rosin; a hot-melt resin and an UV-curing resin. Among them, as a material for the protective layer or the hard coat layer in the substrate surface, most preferred is an UV-curing resin which is excellent in productivity.

The thickness of the hard coat layer in the substrate surface is not restricted and may be properly selected depending on the application. The thickness of the hard coat layer is preferably 0.01 μm to 30 μm, more preferably 0.05 μm to 10 μm.

—Intermediate Layer—

The material for the intermediate layer is not restricted so long as the material can adhesive-bond the first information layer and the second information layer and may be properly selected depending on the application. From the viewpoint of productivity of the optical recording medium, the material is preferably a UV-curing adhesive or a thermosetting adhesive, such as an acrylate resin, epoxy resin and urethane resin, and a hot-melt adhesive.

The thickness of the intermediate layer is not restricted and may be properly selected depending on the optical condition of the recording and reproducing system. The thickness of the intermediate layer for a DVD system is preferably 40 μm to 70 μm.

—Undercoat Layer—

The above-noted undercoat layer is used for such purposes as (1) improving adhesive properties, (2) protecting the recording medium from water and a gas, (3) improving the preservation stability of the recording layer, (4) improving the reflectance, (5) protecting the substrate and the recording layer from a solvent and (6) forming a guide groove, guide pit and preformat.

For the purpose of (1), a polymer material, such as an iomer resin, a polyamide resin, a vinyl resin, a natural resin, a natural polymer, a silicone, a liquid rubber and a silane coupling agent can be used. For the purposes of (2) and (3), besides the above-noted polymer materials, an inorganic compound, such as $SiO_2$, $MgF_2$, SiO, $TiO_2$, ZnO, TiN and SiN; and a metal or a semi-metal, such as Zn, Cu, Ni, Cr, Ge, Se, Au, Ag and Al can be used. For the purpose of (4), a metal, such as Al and Ag and an organic thin film having a metallic sheen, such as a methine dye and xanthene dye can be used. For the purposes of (5) and (6), an UV-curing resin, a thermosetting resin and a thermal plastic resin can be used.

The thickness of the undercoat layer is not restricted and may be properly selected depending on the application. The thickness of the undercoat layer is preferably 0.01 μm to 30 μm, more preferably 0.05 μm to 10 μm.

According to the present invention, the above-noted undercoat layer, protective layer, intermediate layer and hard coat layer in the surface of the substrate may comprise, like the recording layer, depending on the application, a stabilizer, a dispersant, a flame-retardant, a lubricant, an antistatic agent, a surfactant and a plasticizer.

(Manufacturing Method of Optical Recording Medium)

The manufacturing method of the optical recording medium according to the present invention comprises disposing the first information layer, disposing the second information layer, laminating these information layers to each other and optionally other steps.

<Disposing of First Information Layer>

The disposing of the first information layer comprises disposing the first reflective layer, disposing the first recording layer and optionally other steps. The substrate on which the first recording layer is disposed can be produced according to the same steps as that in a manufacturing method of a conventional DVD+R or DVD-ROM.

—Disposing of First Recording Layer—

The disposing of the first recording layer comprises coating the first substrate in which in the surface thereof, at least any one of the groove and the pit is formed, with a coating liquid for disposing the first recording layer which comprises an organic dye and an organic solvent; and drying the resultant coating as the first recording layer, thereby disposing the first recording layer.

Examples of the coating method for coating the first substrate with the coating liquid for disposing the first recording layer include a spinner coating method, a spraying coating method, a roller coating method, a dipping coating method and a spinning coating method. Among them, since the thickness of the first recording layer can be controlled by controlling the density, viscosity and distilling-off temperature of solvent of the coating liquid for disposing the first recording layer, a spinning coating method is desired.

The above-noted organic solvent is not restricted and may be properly selected depending on the application. Examples of the organic solvent include an alcohol, such as methanol, ethanol, isopropyl alcohol and 2,2,3,3-tetrafluoro propanol; a ketone, such as acetone, methyl ethyl ketone and cyclohexanone; an amide, such as N,N-dimethylformamide and N,N-dimethylacetoamide; a sulfoxide, such as dimethylsulfoxide; an ether, such as tetrahydrofuran, dioxane, diethyl ether and ethylene glycol monomethyl ether; an ester, such as methyl acetate and ethyl acetate; a halogenated aliphatic hydrocarbon, such as chloroform, methylene chloride, dichloroethane, carbon tetrachloride and trichloroethane; an aromatic hydrocarbon, such as benzene, xylene, monochloro benzene and dichloro benzene; a cellosolve, such as methoxy ethanol and ethoxy ethanol; and a hydrocarbon, such as hexane, pentane, cyclohexane and methyl cyclohexane.

—Disposing of First Reflective Layer—

The disposing of the first reflective layer comprises disposing the first reflective layer on the first recording layer according to a film formation method. Examples of the film formation method include a vacuum metallizing method, a sputtering method, a plasma CVD method, a photo-CVD method, an ion plating method and an electron beam metallizing method. Among them, from the viewpoint of having an excellent mass-productivity and an excellent film quality, the sputtering method is preferred.

<Disposing of Second Information Layer>

The disposing of the second information layer comprises disposing the second reflective layer, disposing the second recording layer, disposing the protective layer and optionally other steps. The substrate on which the second recording layer is disposed can be produced according to the same steps as that in a manufacturing method of a conventional DVD+R or DVD-ROM.

—Disposing of Second Reflective Layer—

The disposing of the second reflective layer comprises disposing the second reflective layer on the second substrate in which in the surface thereof, at least any one of the groove and the pit is formed, according to a film formation method. Examples of the film formation method include a vacuum metallizing method, a sputtering method, a plasma CVD method, a photo-CVD method, an ion plating method and an electron beam metallizing method. Among them, from the viewpoint of having an excellent mass-productivity and an excellent film quality, the sputtering method is preferred.

—Disposing the Second Recording Layer—

The disposing of the second recording layer comprises coating the above-disposed reflective layer with a coating liquid for disposing the second recording layer which comprises an organic dye (a squarylium metal chelate compound represented by Formula (1)); and drying the resultant coating as the second recording layer, thereby disposing the second recording layer.

Examples of the coating method for coating the second substrate with the coating liquid for disposing the second recording layer include the above-exemplified methods in the above section of —Disposing of First Recording Layer—

—Disposing of Protective Layer—

The disposing of the protective layer comprises disposing the protective layer on the second recording layer according to a film formation method. Examples of the film formation method include a vacuum metallizing method, a sputtering method, a plasma CVD method, a photo-CVD method, an ion plating method and an electron beam metallizing method. Among them, from the viewpoint of having an excellent mass-productivity and an excellent film quality, the sputtering method is preferred.

<Laminating>

The laminating comprises laminating the first information layer to the second information layer through the intermediate layer, wherein the first and second recording layers are located in the inside of the optical recording medium.

The laminating comprises dropping an adhesive onto the surface of the second information layer in which the protective layer is disposed, superimposing the first information layer onto the second information layer, spreading uniformly the adhesive between the first and second information layers and curing the adhesive film as the intermediate layer by irradiating an ultraviolet light to the adhesive film. It is preferred that the adhesive film as the intermediate layer which is produced using an ultraviolet light curing the adhesive, has a high light transmittance.

Examples of the above-noted other steps include disposing the undercoat layer and disposing the hard coat layer.

(Recording and Reproducing Method of Optical Recording Medium)

The recording and reproducing method of the optical recording medium according to the present invention comprises performing at least one of recording and reproducing signal information in the first recording layer and the second recording layer by irradiating a light having a wavelength of 580 nm to 720 nm which is used for recordation, to the surface of the first substrate.

More specifically, while rotating the optical recording medium at a specified linear speed or a specified constant angle velocity, to the surface of the first substrate of the rotating optical recording medium, a light for recordation, such as a semiconductive laser (for example, having an oscillation wavelength of 650 nm) is irradiated through an objective lens. The first and second recording layers absorb the irradiated light, thereby elevating the temperature of a part of the recording layers locally and in the recording layers, for example a pit is caused and optical properties of the recording layers are changed, so that information can be recorded in the first and second recording layers. The reproduction of the recorded information in the recording layers can be performed by irradiating a laser light to the surface of the first substrate while rotating the optical recording medium at a specified linear speed and by detecting a reflected light which is produced in the recording layers in which information is recorded.

(Optical Recording Apparatus)

The optical recording apparatus according to the present invention is an optical recording apparatus comprising a light source from which a light is irradiated to an optical recording medium for recording information in the optical recording medium, wherein the optical recording medium is the optical recording medium according to the present invention.

The optical recording apparatus is not restricted and may be properly selected depending on the application. An example of the optical recording apparatus comprises a laser source from which a laser, such as a semiconductive laser is irradiated; a collective lens collecting the laser irradiated from the laser source to the optical recording medium fixed in a spindle; a laser detector detecting a portion of the laser irradiated from the laser source; an optical element leading the laser irradiated from the laser source to the collective lens and the laser detector; and optionally other units.

In the above-noted optical recording apparatus, by leading the laser irradiated from the laser source to the collective lens through the optical element and by collecting and irradiating the laser to the optical recording medium through the collective lens, the recording is performed in the optical recording medium. Here, in the optical recording apparatus, a portion of the laser irradiated from the laser source is led to the laser detector, so that the laser detector can control the light amount of the laser irradiated from the laser source depending on the light amount of the laser detected by the laser detector.

The laser detector outputs a detected light amount of the laser as a light amount signal in a voltage or current converted from the light amount detected by the laser detector.

Examples of the above-noted other units include a controlling unit. The controlling unit is not restricted so long as the controlling unit can control each of the above-noted units and may be properly selected depending on the application. Examples of the controlling unit include a sequencer and a computer.

Since the optical recording apparatus according to the present invention is equipped with the optical recording medium according to the present invention which can obtain excellent recording signal properties and can suppress the amount of the crosstalk of the recording mark, in the optical recording apparatus according to the present invention, a stable recording having a high reflectance and high modulation factor can be performed.

Hereinbelow, the present invention will be described in more detail with reference to the following Examples and Comparative Examples, which should not be construed as limiting the scope of the present invention.

Example 1

Preparation of Optical Recording Medium

A second substrate made of polycarbonate resin having a diameter of 120 mm and a thickness of 0.57 mm, on which a concave-convex pattern of a guide groove having a depth of 32 nm (320 angstrom) and a width (at the bottom of the groove) of 0.25 μm was formed, wherein the pattern had a track pitch of 0.74 μm, was prepared. On the second substrate, the second reflective layer having a thickness of 150 nm (1,500 angstrom) comprising AgIn (mixing ratio (Ag/In) in atomic % is 99.5/0.5) was disposed by a sputtering method (using Ar gas as a sputtering gas).

Next, on the surface of the AgIn reflective layer, the second recroding layer having a thickness of 80 nm (800 angstrom) was disposed by the spin coating using a coating liquid prepared by dissolving the squarylium metal chelate compound A represented by the following formula in 2,2,3,3-tetrafluoropropanol. A light absorption spectrum of the second recording layer was measured and it was found that with respect to the second recording layer, the wavelength corresponding to the maximum light absorbance was 607 nm and the maximum light absorbance (Abs.) was 1.17. The thickness of the second recording layer was measured using a sectional image of the second recording layer taken in a photograph using a transmission electron microscope (TEM).

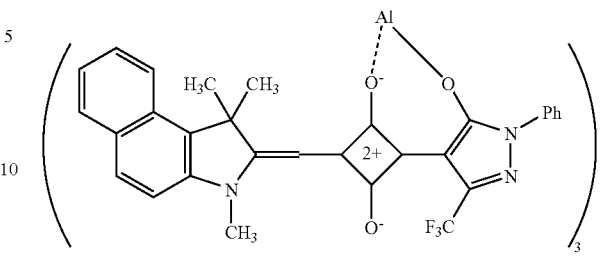

<Compound A> wherein Ph represents a phenyl group.

Next, on the second recording layer, a protective layer comprising ZnS—SiC (molar ratio ZnS/SiC is 8/2) was disposed by a sputtering method using Ar gas as a sputtering gas so that the protective layer had a thickness of 140 nm (1,400 angstrom), thereby producing the second information layer.

On the other hand, in the surface of the first substrate made of a polycarbonate resin which had a diameter of 120 mm and the thickness of 0.57 mm, an information pit for a DVD-ROM was formed. On the first substrate, a reflective layer comprising AgIn (mixing ratio (Ag/In) in atomic % is 99.5/0.5) was disposed so that the reflective layer had a thickness of 12 nm (120 angstrom), thereby producing the first information layer.

Next, the above-produced first information layer and second information layer were laminated to each other using an ultraviolet curing adhesive (trade name: KAYARAD DVD 576; manufactured and sold by Nippon Kayaku Co., Ltd.), thereby producing an optical recording medium comprising two recording layers and having a layers composition shown in FIG. 2.

In the second recording layer of the obtained optical recording medium, a DVD (8-16) signal was recorded under conditions wherein the wavelength was 657 nm, the numerical aperture (NA) was 0.65 and the linear speed was 9.2 m/sec, and thereafter the reproduction in the second recording layer was evaluated under condition wherein the linear speed was 3.5 m/s. As a result of the evaluation, it was found that the second recording layer had a reflectance (I14H) of 20%, a modulation factor (I14/I14H) of 90% and PIsum 8 of 20 or less after the recording and the evaluation result could satisfy the DVD-ROM standard. For the evaluation, a recording evaluation apparatus for the DVD (trade name: DDU1000; manufactured and sold by Pulse Tech Products Corporation) was used.

Example 2

Producing of Optical Recording Medium

First, in the same manner as in Example 1, the second information layer was disposed on the second substrate made of a polycarbonate resin which had a diameter of 120 mm and a thickness of 0.57 mm and on which a guide groove convex-concave pattern having a depth of 32 nm (320 angstrom), a width (at the bottom of the groove) of 0.25 μm and a track pitch of 0.74 μm was formed, thereby producing the second information layer.

On the other hand, the first substrate made of a polycarbonate resin which had a diameter of 120 mm and a thickness of 0.58 mm and in which in the surface thereof, a guide groove convex-concave pattern having a depth of 150 nm (1,500 angstrom), a width (at the bottom of the groove) of 0.25 μm and a track pitch of 0.74 μm was formed, was prepared. On the first substrate, the first recording layer having a thickness of 50 nm (500 angstrom) was disposed by a spinning coating using a coating liquid prepared dissolving a mixture produced by mixing a squarylium metal chelate compound A represented by the above-noted formula and a formazan metal chelate compound represented by the following formula in a mixing mass ratio (squarylium metal chelate compound A/formazan metal chelate compound) of 7/3 in 2,2,3,3-tetrafluoropropanol.

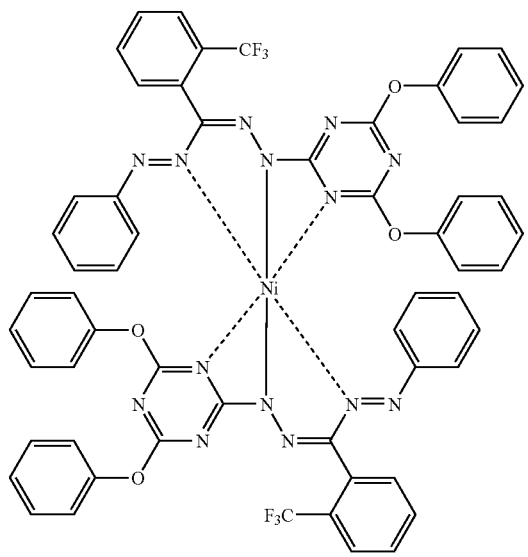

Next, on the first recording layer, a reflective layer having a thickness of 12 nm (120 angstrom) and comprising AgIn (mixing ratio (Ag/In) in atomic % is 99.5/0.5) was disposed according to a sputtering method using Ar gas as a sputtering gas, thereby producing the first information layer.

Next, the above-produced first information layer and second information layer were laminated using an ultraviolet curing adhesive (trade name: KAYARAD DVD 576; manufactured and sold by Nippon Kayaku Co., Ltd.), thereby producing an optical recording medium comprising two recording layers and having a layers composition shown in FIG. 3.

The second recording layer of the obtained optical recording medium was evaluated in substantially the same manner as in Example 1 and as the result of the evaluation, it was found that the second recording layer after the recording had a reflectance (I14H) of 18%, a modulation factor (I14/H14) of 90%, PIsum 8 of 20 or less and a jitter of 7.8% and the result of the evaluation of the second recording layer can satisfy the DVD-ROM standard.

With respect to the first recording layer, the light resistance was evaluated in substantially the same manner as in the above-noted evaluation method for the second recording layer and as a result of the evaluation, it was found that the PIsum 8 value of the first recording layer after the xenone lamp light having an illuminance of 50,000 lux was irradiated for 200 hours, could not satisfy the PIsum 8 standard value (<280).

Further, to the surface of the obtained optical recording medium to which a light for recordation and reproduction was irradiated, a xenone lamp light having an illuminance of 50,000 lux was irradiated for 500 hours and then, the PIsum 8 of the second recording layer was measured and found to be 20 or less. The result of the measurement and the evaluation is shown in Table 1.

Example 3

Producing of Optical Recording Medium

The optical recording medium was produced in substantially the same manner as in Example 2, except that the squarylium metal chelate compound A used for disposing the second recording layer was changed to a squarylium metal chelate compound B represented by the following formula.

The obtained optical recording medium was evaluated in substantially the same manner as in Example 2 and as a result of the evaluation, it was confirmed that the obtained optical recording medium had advantageous signal properties and excellent light resistance which can satisfy the DVD-ROM standard. The result of the evaluation is shown in Table 1.

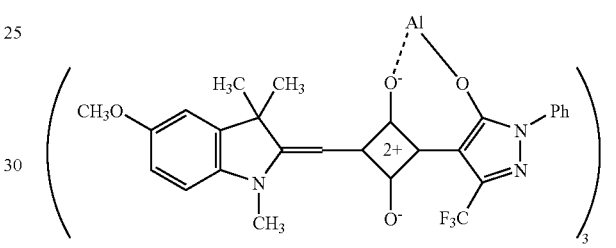

<Compound B> wherein Ph represents a phenyl group.

Example 4

Producing of Optical Recording Medium

The optical recording medium was produced in substantially the same manner as in Example 2, except that the squarylium metal chelate compound A used for disposing the second recording layer was changed to a squarylium metal chelate compound C represented by the following formula.

The obtained optical recording medium was evaluated in substantially the same manner as in Example 2 and as a result of the evaluation, it was confirmed that the obtained optical recording medium has advantageous signal properties and excellent light resistance which can satisfy the DVD-ROM standard. The result of the evaluation is shown in Table 1.

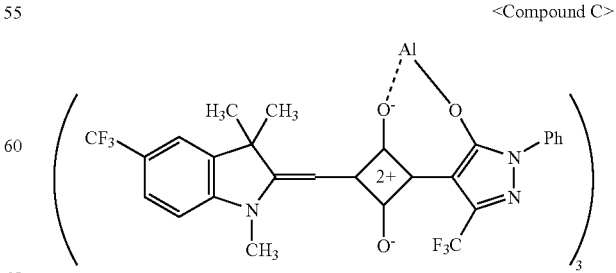

<Compound C> wherein Ph represents a phenyl group.

Example 5

Producing of Optical Recording Medium

The optical recording medium was produced in substantially the same manner as in Example 2, except that the squarylium metal chelate compound A used for disposing the second recording layer was changed to a squarylium metal chelate compound D represented by the following formula.

The obtained optical recording medium was evaluated in substantially the same manner as in Example 2 and as a result of the evaluation, it was confirmed that the obtained optical recording medium had advantageous signal properties and excellent light resistance which could satisfy the DVD-ROM standard. The result of the evaluation is shown in Table 1.

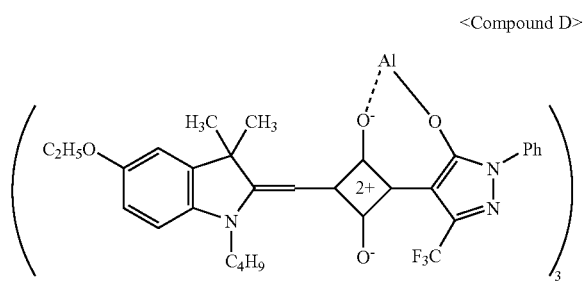

<Compound D> wherein Ph represents a phenyl group.

Example 6

Producing of Optical Recording Medium

The optical recording medium was produced in substantially the same manner as in Example 2, except that the squarylium metal chelate compound A used for disposing the second recording layer was changed to a squarylium metal chelate compound E represented by the following formula.

The obtained optical recording medium was evaluated in substantially the same manner as in Example 2 and as a result of the evaluation, it was confirmed that the obtained optical recording medium had advantageous signal properties and excellent light resistance which could satisfy the DVD-ROM standard. The result of the evaluation is shown in Table 1.

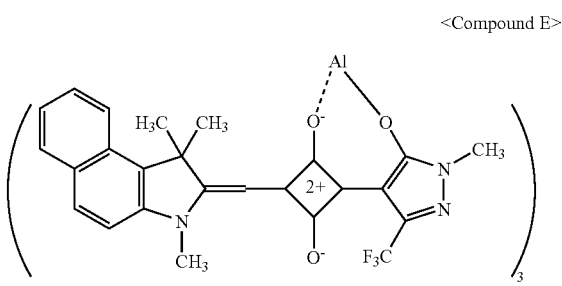

<Compound E>

Example 7

Producing of Optical Recording Medium

The optical recording medium was produced in substantially the same manner as in Example 2, except that the squarylium metal chelate compound A used for disposing the second recording layer was changed to a squarylium metal chelate compound F represented by the following formula.

The obtained optical recording medium was evaluated in substantially the same manner as in Example 2 and as a result of the evaluation, it was confirmed that the obtained optical recording medium had advantageous signal properties and excellent light resistance which could satisfy the DVD-ROM standard. The result of the evaluation is shown in Table 1.

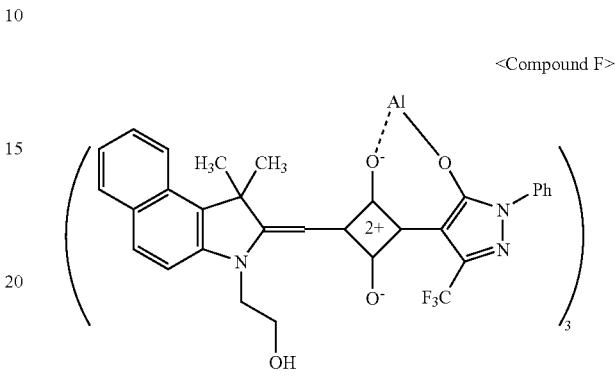

<Compound F> wherein Ph represents a phenyl group.

Example 8

Producing of Optical Recording Medium

The optical recording medium was produced in substantially the same manner as in Example 2, except that the squarylium metal chelate compound A used for disposing the second recording layer was changed to a mixture of the compound A and a squarylium metal chelate compound G represented by the following formula in a mixing mass ratio (Compound A/Compound G) of 7/3.

The obtained optical recording medium was evaluated in substantially the same manner as in Example 2 and as a result of the evaluation, it was confirmed that the obtained optical recording medium had advantageous signal properties and excellent light resistance which could satisfy the DVD-ROM standard. The result of the evaluation is shown in Table 1.

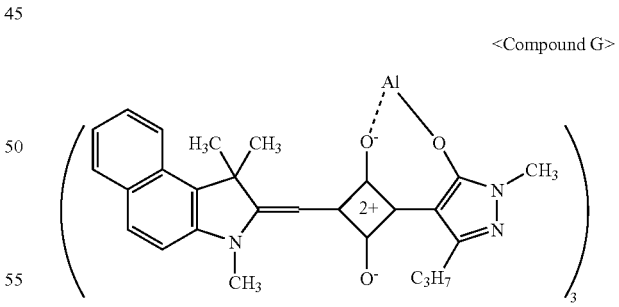

<Compound G> wherein Ph represents a phenyl group.

Example 9

The optical recording medium was produced in substantially the same manner as in Example 2, except that the thickness of the second recording layer was changed to 50 nm (500 angstrom) and the thickness of the protective layer comprising ZnS—SiC (in molar ratio ZnS/SiC of 8/2) was changed to 180 nm (1,800 angstrom).

The obtained optical recording medium was evaluated in substantially the same manner as in Example 2 and as a result of the evaluation, it was confirmed that the obtained optical recording medium had advantageous signal properties and excellent light resistance which could satisfy the DVD-ROM standard. The result of the evaluation is shown in Table 1.

Example 10

The optical recording medium was produced in substantially the same manner as in Example 2, except that the thickness of the second recording layer was changed to 100 nm (1,000 angstrom) and the thickness of the protective layer comprising ZnS—SiC (in molar ratio ZnS/SiC of 8/2) was changed to 80 nm (800 angstrom).

The obtained optical recording medium was evaluated in substantially the same manner as in Example 2 and as a result of the evaluation, it was confirmed that the obtained optical recording medium had advantageous signal properties and excellent light resistance which could satisfy the DVD-ROM standard. The result of the evaluation is shown in Table 1.

Example 11

The optical recording medium was produced in substantially the same manner as in Example 5, except that the depth of the guide groove in the second substrate was changed to 60 nm (600 angstrom) and the thickness of the protective layer comprising ZnS—SiC (in molar ratio ZnS/SiC of 8/2) was changed to 180 nm (1,800 angstrom).

The obtained optical recording medium was evaluated in substantially the same manner as in Example 1 and as a result of the evaluation, it was found that the second recording layer had a reflectance of 18% which could satisfy the DVD reflectance standard (a high level of HF signal expressed in "I14H" according the DVD standard is 18% or more).

Example 12

Producing of Optical Recording Medium

The optical recording medium was produced in substantially the same manner as in Example 5, except that the depth of the guide groove in the second substrate was changed to 20 nm (200 angstrom) and the thickness of the protective layer comprising ZnS—SiC (in molar ratio ZnS/SiC of 8/2) was changed to 80 nm (800 angstrom).

The obtained optical recording medium was evaluated in substantially the same manner as in Example 1 and as a result of the evaluation, it was found that the second recording layer had a reflectance of 18% which could satisfy the DVD reflectance standard (a high level of HF signal expressed in "I14H" according the DVD standard is 18% or more).

Comparative Example 1

Producing of Optical Recording Medium

The optical recording medium was produced in substantially the same manner as in Example 2, except that in the second information layer, the protective layer was not disposed.

With respect to the first recording layer in Example 2, the light resistance was evaluated in substantially the same manner as in Example 2 and as a result of the evaluation, it was found that the PIsum 8 value of the first recording layer after the xenone lamp light having an illuminance of 50,000 lux was irradiated for 20 hours, could not satisfy the PIsum 8 standard value (<280).

TABLE 1

|  | Squarylium metal chelate compound | Wave length for maximum light absorbance (nm) | Abs. | I14R*[1] | REF*[1] (%) | JITTER (%) | PIsum8 | PIsum8 after exposed to light |
|---|---|---|---|---|---|---|---|---|
| Example 2 | Compound A | 607.0 | 1.17 | 0.90 | 18 | 7.8 | 20 or less | 20 or less |
| Example 3 | Compound B | 598.5 | 1.15 | 0.91 | 21 | 7.2 | 20 or less | 20 or less |
| Example 4 | Compound C | 589.0 | 1.48 | 0.92 | 23 | 9.0 | 50 | 50 |
| Example 5 | Compound D | 600.0 | 1.23 | 0.91 | 21 | 7.2 | 20 or less | 20 or less |
| Example 6 | Compound E | 611.0 | 1.51 | 0.91 | 18 | 9.0 | 60 | 60 |
| Example 7 | Compound F | 605.5 | 1.09 | 0.89 | 18 | 7.7 | 20 or less | 20 or less |
| Example 8 | Compound A + Compound G (70:30)*[2] | 611.5 | 1.10 | 0.85 | 18 | 7.2 | 20 or less | 20 or less |
| Example 9 | Compound A | 607.0 | 0.75 | 0.65 | 18 | 9.0 | 20 or less | 20 or less |
| Example 10 | Compound A | 607.0 | 1.45 | 0.92 | 19 | 8.5 | 20 or less | 20 or less |

*[1] "I14R" means "I14/I14H" and "REF (%)" means "I14H".
*[2] (70:30) means the mixing mass ratio (Compound A: Compound G) between the squarylium metal chelate compounds A and G.

The optical recording medium according to the present invention is excellent in light resistance, has advantageous recording signal properties and can be either preferably applied to a rewritable DVD disc system, or particularly widely applied to a DVD+R disc, a DVD-R disc and the like.

According to the present invention, various problems accompanying with the background art can be solved and in an optical recording medium comprising two recoding layers, such as the first recording layer and the second recording layer, even in the second recoding layer which is located more distant from the substrate to which the laser is irradiated than the first recording layer, advantageous recording signal properties can be obtained, so that an optical recording medium which exhibits excellent light resistance and high performance can be provided.

The invention claimed is:

1. An optical recording medium comprising:
a first substrate,
a first information layer,
an intermediate layer,
a second information layer, and
a second substrate in this order,
wherein the first information layer comprises a first recording layer disposed on the first substrate and the second information layer comprises a reflective layer, a second recording layer comprising an organic dye and a protective layer which are disposed on the second substrate in this order; and the second recording layer comprises an organic dye which is at least one selected from the group consisting of the squarylium metal chelate compounds represented by the following Formula (1):

$$a\text{-M-b}$$
$$|$$
$$(c)_m$$
Formula (1)

wherein M represents a metal atom having a coordination function; m is an integer of 0 or 1; and when m is 0, a and b may be the same as or different from each other, and represent a squarylium dye ligand represented by the following Formula (2), or when m is 1, a, b and c may be the same as or different from each other, and represent a squarylium dye ligand represented by the following Formula (2):

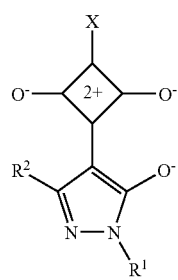

Formula (2)

wherein $R^1$ and $R^2$ may be the same as or different from each other, and represent any one of an alkyl group which may be substituted, an aralkyl group which may be substituted, an aryl group which may be substituted and a heterocyclic group which may be substituted; and X represents any one of an aryl group which may be substituted, a heterocyclic group which may be substituted and a $Z_3$=CH group ($Z_3$ represents a heterocyclic group which may be substituted).

2. The optical recording medium according to claim 1, wherein X is a group represented by the following Formula (3):

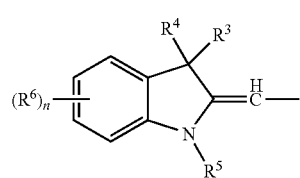

Formula (3)

wherein $R^3$ and $R^4$ may be the same as or different from each other, and represent an alkyl group which may be substituted, and $R^3$ and $R^4$ are taken together with an adjacent carbon atom to form an alicyclic hydrocarbon ring which may be substituted; $R^5$ represents any one of a hydrogen atom, an alkyl group which may be substituted, an aralkyl group which may be substituted and an aryl group which may be substituted; $R^6$ represents any one of a halogen atom, a nitro group, a cyano group, an alkyl group which may be substituted, an aralkyl group which may be substituted, an aryl group which may be substituted and an alkoxy group which may be substituted; and n is an integer of 0 to 4 and when n is an integer of 2 to 4, plural $R^6$s may be the same as or different from each other, and $R^6$s are taken together with two adjacent carbon atoms to form an aromatic ring which may be substituted.

3. The optical recording medium according to claim 2, wherein $R^6$ in Formula (3) is an alkoxy group.

4. The optical recording medium according to claim 1, wherein X is a group represented by the following Formula (4):

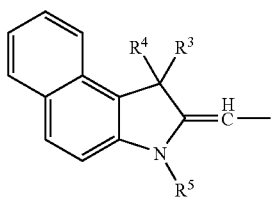

Formula (4)

wherein $R^3$ and $R^4$ may be the same as or different from each other, and represent an alkyl group which may be substituted, and $R^3$ and $R^4$ are taken together with an adjacent carbon atom to form an alicyclic hydrocarbon ring which may be substituted; and $R^5$ represents any one of a hydrogen atom, an alkyl group which may be substituted, an aralkyl group which may be substituted and an aryl group which may be substituted.

5. The optical recording medium according to claim 1, wherein the second recording layer has a thickness of 50 nm to 100 nm.

6. The optical recording medium according to claim 1, wherein the first recording layer comprises a reflective film and is for reproduction-only.

7. The optical recording medium according to claim 1, wherein the first information layer comprises the first recording layer comprising an organic dye and a first reflective layer which are disposed on the first substrate in this order.

8. The optical recording medium according to claim 7, wherein the first recording layer comprises a light-resisting agent.

9. The optical recording medium according to claim 8, wherein the organic dye is a squarylium metal chelate compound and the light-resisting agent is a formazan metal chelate compound.

10. The optical recording medium according to claim 1, wherein the protective layer has a thickness of 80 nm to 180 nm.

11. The optical recording medium according to claim 1, wherein the protective layer comprises ZnS.

12. The optical recording medium according to claim 1, wherein the second substrate comprises a guide groove having a depth of 20 nm to 60 nm.

13. A recording method and a reproducing method of an optical recording medium comprising:

performing at least one of the recording and the reproducing of signal information in the first recording layer and the second recording layer by irradiating a light having a wavelength of 580 nm to 720 nm which is used for recordation, to the surface of the first substrate in the optical recording medium, wherein the optical recording medium is an optical recording medium comprising:

a first substrate, a first information layer, an intermediate layer, a second information layer, and a second substrate in this order, wherein the first information layer comprises a first recording layer disposed on the first substrate and the second information layer comprises a reflective layer, a second recording layer comprising an organic dye and a protective layer which are disposed on the second substrate in this order; and the second recording layer comprises an organic dye which is at least one selected from the group consisting of the squarylium metal chelate compounds represented by the following Formula (1):

Formula (1)

wherein M represents a metal atom having a coordination function; m is an integer of 0 or 1; and when m is 0, a and b may be the same as or different from each other, and represent a squarylium dye ligand represented by the following Formula (2), or when m is 1, a, b and c may be the same as or different from each other, and represent a squarylium dye ligand represented by the following Formula (2):

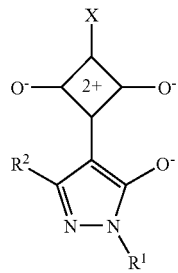

Formula (2)

wherein $R^1$ and $R^2$ may be the same as or different from each other, and represent any one of an alkyl group which may be substituted, an aralkyl group which may be substituted, an aryl group which may be substituted and a heterocyclic group which may be substituted; and X represents any one of an aryl group which may be substituted, a heterocyclic group which may be substituted and a $Z_3$=CH— group ($Z_3$ represents a heterocyclic group which may be substituted).

14. An optical recording apparatus comprising:

a light source from which a light is irradiated to an optical recording medium for recording information in the optical recording medium, wherein the optical recording medium is an optical recording medium comprising:

a first substrate, a first information layer, an intermediate layer, a second information layer, and a second substrate in this order, wherein the first information layer comprises a first recording layer disposed on the first substrate and the second information layer comprises a reflective layer, a second recording layer comprising an organic dye and a protective layer which are disposed on the second substrate in this order; and the second recording layer comprises an organic dye which is at least one selected from the group consisting of the squarylium metal chelate compounds represented by the following Formula (1):

Formula (1)

wherein M represents a metal atom having a coordination function; m is an integer of 0 or 1; and when m is 0, a and b may be the same as or different from each other, and represent a squarylium dye ligand represented by the following Formula (2), when m is 1, a, b and c may be the same as or different from each other, and represent a squarylium dye ligand represented by the following Formula (2):

Formula (2)

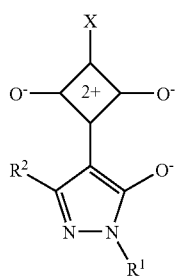

wherein $R^1$ and $R^2$ may be the same as or different from each other, and represent any one of an alkyl group which may be substituted, an aralkyl group which may be substituted, an aryl group which may be substituted and a heterocyclic group which may be substituted; and X represents any one of an aryl group which may be substituted, a heterocyclic group which may be substituted and a $Z_3$=CH— group ($Z_3$ represents a heterocyclic group which may be substituted).

\* \* \* \* \*

UNITED STATES PATENT AND TRADEMARK OFFICE
CERTIFICATE OF CORRECTION

| | | |
|---|---|---|
| PATENT NO. | : 7,710,855 B2 | Page 1 of 1 |
| APPLICATION NO. | : 11/631467 | |
| DATED | : May 4, 2010 | |
| INVENTOR(S) | : Yashiro et al. | |

It is certified that error appears in the above-identified patent and that said Letters Patent is hereby corrected as shown below:

Title page, Item (73) on the cover page of the patent replace with the following:

-- (73)  Assignee:  Ricoh Company, Ltd., Tokyo (JP);
Kyowa Hakko Chemical Co., Ltd., Tokyo (JP). --

Signed and Sealed this
Twenty-second Day of November, 2011

David J. Kappos
*Director of the United States Patent and Trademark Office*